(12) United States Patent
Osaka et al.

(10) Patent No.: US 12,197,107 B2
(45) Date of Patent: Jan. 14, 2025

(54) OPTICAL ELEMENT DRIVING DEVICE, CAMERA MODULE, AND CAMERA-MOUNTED DEVICE

(71) Applicants: Tomohiko Osaka, Tokyo (JP); Shun Suzuki, Tokyo (JP); Meng Wang, Tokyo (JP)

(72) Inventors: Tomohiko Osaka, Tokyo (JP); Shun Suzuki, Tokyo (JP); Meng Wang, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 30 days.

(21) Appl. No.: 18/118,162

(22) Filed: Mar. 7, 2023

(65) Prior Publication Data
US 2023/0288781 A1 Sep. 14, 2023

(30) Foreign Application Priority Data
Mar. 8, 2022 (JP) .................................. 2022-035472

(51) Int. Cl.
*G03B 13/36* (2021.01)
*G03B 30/00* (2021.01)

(52) U.S. Cl.
CPC .............. *G03B 13/36* (2013.01); *G03B 30/00* (2021.01)

(58) Field of Classification Search
CPC ........ G03B 13/36; G03B 30/00; G03B 17/02; G03B 3/10; G03B 5/00; G03B 17/12; G03B 2205/0053; G02B 7/09; G02B 7/08; H04N 23/54; H04N 23/55
See application file for complete search history.

(56) References Cited

U.S. PATENT DOCUMENTS

| | | |
|---|---|---|
| 2013/0258506 A1 | 10/2013 | Lee |
| 2017/0108660 A1 | 4/2017 | Kuo |
| 2017/0205600 A1* | 7/2017 | Kim .................. G02B 7/08 |
| 2019/0294027 A1* | 9/2019 | Kim .................. G03B 5/00 |
| 2021/0092264 A1 | 3/2021 | Kang |
| 2022/0099917 A1* | 3/2022 | Seo ................ G02B 27/646 |
| 2023/0341650 A1* | 10/2023 | Park ................ H04N 23/55 |

FOREIGN PATENT DOCUMENTS

| | | |
|---|---|---|
| CN | 110456474 | 11/2019 |
| CN | 211878281 | 11/2020 |
| JP | 2008-040188 | 2/2008 |

(Continued)

*Primary Examiner* — Shahbaz Nazrul (57) ABSTRACT

An optical element driving device driving an optical element in the optical path direction includes: a holding part capable of holding the optical element; an housing part that surrounds a circumference of the holding part and houses the holding part; and inside the housing part, a support part including a first support part and a second support part disposed on the circumference at different positions, and supports the holding part to be movable in the optical path direction by pressing the holding part by the first support part and engaging the second support part with the holding part in accordance with the pressing. The support part is configured to allow adjustment of an engagement position between the second support part and the holding part by relatively displacing facing portions of the second support part and the holding part in a circumferential direction according to the pressing.

12 Claims, 5 Drawing Sheets

(56) References Cited

FOREIGN PATENT DOCUMENTS

| | | |
|---|---|---|
| JP | 2009-216934 | 9/2009 |
| JP | 2013-235124 | 11/2013 |
| JP | 2014-197067 | 10/2014 |
| JP | 2017-076020 | 4/2017 |
| JP | 2023-538805 | 9/2023 |
| KR | 10-2020-0144349 | 12/2020 |

\* cited by examiner

OPTICAL ELEMENT DRIVING DEVICE, CAMERA MODULE, AND CAMERA-MOUNTED DEVICE

CROSS REFERENCE TO RELATED APPLICATIONS

This application claims the benefit of priority of Japanese Patent Application No. 2022-035472 filed on Mar. 8, 2022, the contents of which are incorporated herein by reference in their entirety.

TECHNICAL FIELD

The present invention relates to an optical element driving device for driving an optical element, a camera module, and a camera-mounted device.

BACKGROUND ART

Typically, a camera module is mounted in a camera-mounted device such as a smartphone or a drone. Such a camera module includes an optical element driving device for driving an optical element. Drones are unmanned aircrafts that can be flown by remote control or automatic control, and some of them are called multicopters.

An optical element driving device has an autofocus function (hereinafter, referred to as an "AF function" (AF: auto focus)). Such an optical element driving device moves a lens in the optical axis direction by the AF function to automatically perform focusing during the photographing of a subject.

For example, PTL 1 describes an optical element driving device including a housing, a lens holder (holding part) including a magnet part, an inner magnetic material part disposed inside the housing, and a guide part. In PTL 1, the inner magnetic material part is disposed so as to bias a lens holder toward the guide part by an attractive force generated between the inner magnetic body and the magnet part. The guide part includes two pairs of V-shaped recessed groove parts disposed to face each other, and ball members each held between the paired groove parts. The guide part is thus configured to move the lens holder in the optical axis direction.

CITATION LIST

Patent Literature

PTL 1
Japanese Patent Application Laid-Open No. 2014-197067

SUMMARY OF INVENTION

Technical Problem

All parts have manufacturing tolerances. For example, in the case of the optical element driving device of PTL 1, there are individual differences due to tolerances in the dimensions of the parts constituting the optical element driving device, which may cause individual differences in the assembled state of the parts. For example, there are individual differences in the dimensions of the groove parts and ball members that constitute the guide part, which may cause individual differences in the assembled state of the components. The optical element driving device of PTL 1 has a structure such that the ball member is held between the V-shaped recessed groove parts. This structure is not capable of absorbing the effects of the individual differences described above, resulting in unstable support of the lens holder by the guide part, which may cause rattling in the lens holder.

An object of the present invention is to provide an optical element driving device that movably supports a holding part—holding an optical element—in a stable manner, and provide a camera module and a camera-mounted device including the optical element driving device.

Solution to Problem

To achieve the above object, an optical element driving device according to the present invention is as follows:

An optical element driving device that drives an optical element in an optical path direction, the optical element driving device including:
 a holding part capable of holding the optical element;
 a housing part that surrounds a circumference of the holding part and houses the holding part inside the housing part; and
 inside the housing part, a support part that includes at least a first support part and a second support part respectively disposed on the circumference at positions different from each other, wherein the support part supports the holding part to be movable in the optical path direction by pressing the holding part by the first support part and engaging the second support part with the holding part in accordance with the pressing,
 in which
 the support part is configured to allow adjustment of an engagement position between the second support part and the holding part by relatively displacing facing portions of the second support part and the holding part in a circumferential direction according to the pressing, the facing portions facing each other.

To achieve the above object, a camera module according to the present invention includes:
 the optical element driving device described above;
 a driving part that drives the holding part in such a way that the holding part is movable in the optical path direction; and
 an imaging part that captures a subject image by using the optical element.

To achieve the above object, a camera-mounted device according to the present invention is as follows:

A camera-mounted device that is an information device or a transporting device, the camera-mounted device comprising:
 the camera module described above; and
 an image processing part that processes image information obtained by the camera module.

Advantageous Effects of Invention

A holding part holding an optical element can be stably held and moved according to the present invention.

DESCRIPTION OF EMBODIMENTS

Hereinafter, embodiments of the present disclosure will be described in detail with reference to the accompanying drawings.

Smartphone

Figure 1A:
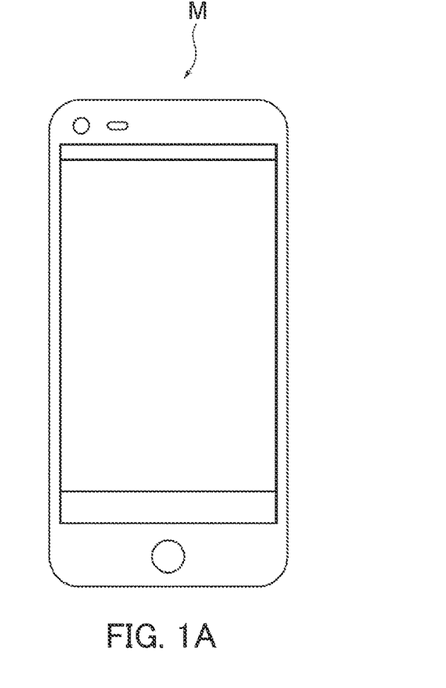
FIG. 1A is a front view illustrating a smartphone equipped with a camera module according to an embodiment of the present invention.
Figure 1B:
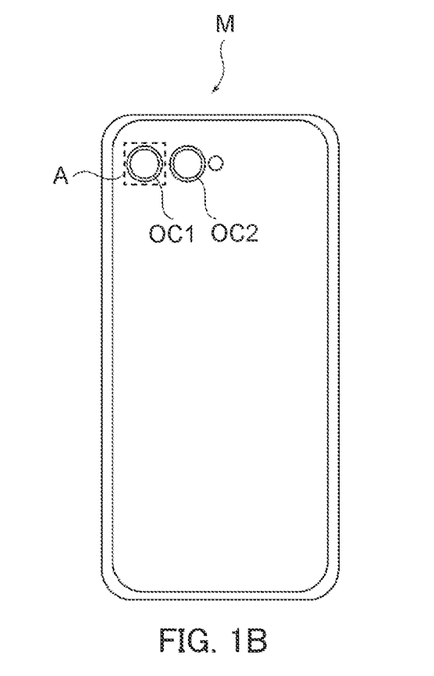
FIG. 1B is a rear view of the smartphone illustrated in FIG. 1A.

FIGS. 1A and 1B illustrate smartphone M (exemplary camera-mounted device) equipped with camera module A according to the present embodiment. FIG. 1A is a front view of smartphone M, and FIG. 1B is a rear view of smartphone M.

Smartphone M includes a dual camera consisting of two rear cameras OC1 and OC2. In the present embodiment, camera module A is applied to rear camera OC1 and/or OC2.

Camera module A has the AF function, and can automatically perform focusing during the photographing of a subject. Camera module A may have a shake correction function (hereinafter referred to as "OIS function" (OIS: optical image stabilization)). The OIS function enables optically correcting of shake (vibration) generated during the photographing, thereby obtaining an image without image blur.

Camera Module

Figure 2:
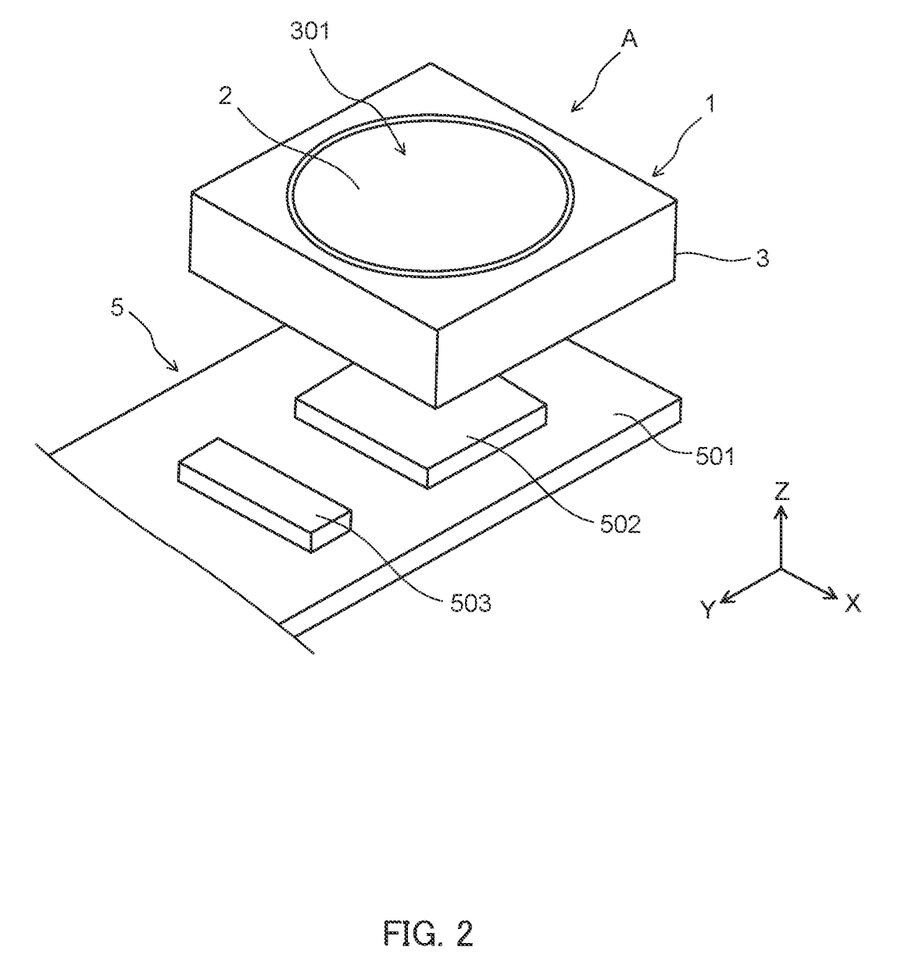
FIG. 2 is a perspective view illustrating the camera module and an imaging part.
Figure 3:
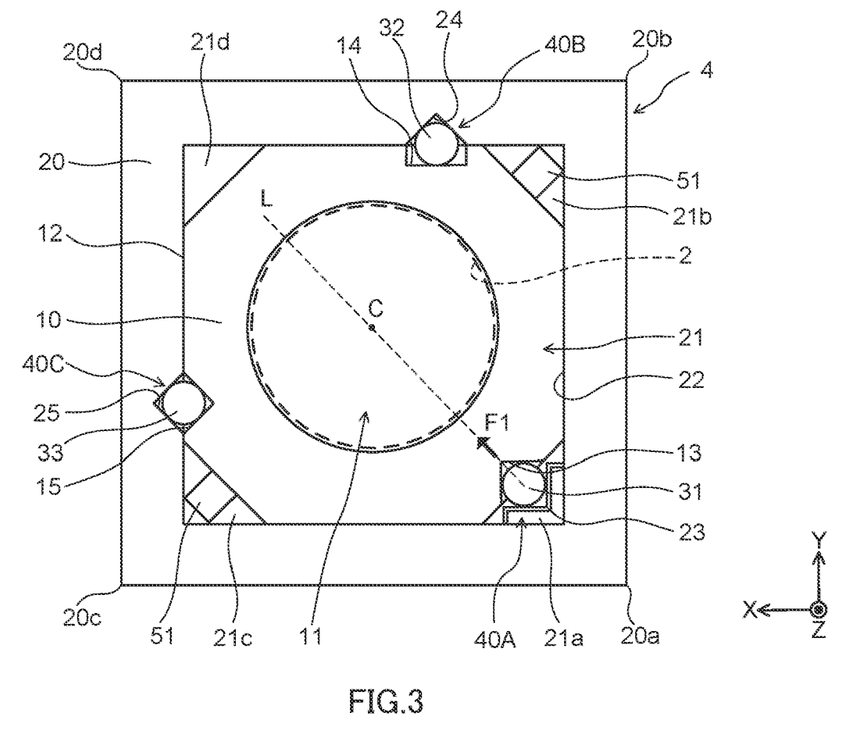
FIG. 3 is a plan view of the main body (herein also referred to as "optical element driving device body") included in an optical element driving device of the camera module.

FIG. 2 is a perspective view illustrating camera module A and imaging part 5. FIG. 3 is a plan view of optical element driving device body 4 included in optical element driving device 1 of camera module A illustrated in FIG. 2. As illustrated in FIGS. 2 and 3, an orthogonal coordinate system (X, Y, Z) is used for the description in the present embodiment. The orthogonal coordinate system (X, Y, Z) is also used in FIGS. 4 to 6 described below.

Camera module A is mounted in such a way that, for example, the X direction is a vertical direction (or a horizontal direction), the Y direction is the horizontal direction (or the vertical direction), and the Z direction is a front-rear direction when smartphone M is used for the photographing. That is, the Z direction is the optical path direction, the upper side (+Z side) in FIG. 2 is the light receiving side in the optical path direction, and the lower side (−Z side) in FIG. 2 is the image forming side in the optical path direction. Hereinafter, a direction orthogonal to the Z axis (Z direction) is referred to as a "Z-axis orthogonal direction" and a plane orthogonal to the Z axis is referred to as a "Z-axis orthogonal plane."

In the present embodiment, the optical path is a path of light formed by opening 301 of cover 3 (described below), opening 11 of holding part 10 (described below), or opening (not illustrated)—for imaging element 502—in housing part 20 (described below). The direction in which the optical path extends (the direction in which each opening is penetrated) is the optical path direction. The optical path direction may also be referred to as an optical axis direction or a focus direction (a direction in which the focus is adjusted) according to the type of optical element.

As illustrated in FIGS. 2 and 3, camera module A includes optical element driving device 1 capable of performing an AF function, lens part 2 that includes a cylindrical lens barrel housing a lens, and imaging part 5 that captures a subject image formed by lens part 2. In other words, optical element driving device 1 is, namely, a lens driving device that drives lens part 2 as an optical element.

Cover

In optical element driving device 1, optical element driving device body 4 is covered with cover 3 on the outer side. Cover 3 is a lidded quadrangular cylinder having a rectangular shape in plan view in the Z direction. In the present embodiment, cover 3 has a square shape in plan view. Cover 3 includes a substantially circular opening 301 on its upper surface. Lens part 2 is housed in opening 11 of holding part 10 of optical element driving device body 4, and faces the outside from opening 301 of cover 3. Lens part 2 is configured to protrude from the opening surface of cover 3 toward the light receiving side as the lens part moves in the Z direction. The inner wall of cover 3 is fixed to the side surface of housing part 20 of optical element driving device body 4 by, for example, adhesion, and houses optical element driving device body 4.

Cover 3 includes a member that blocks electromagnetic waves from the outside of optical element driving device 1, for example, a shield member made of a magnetic material.

Imaging Part

Imaging part 5 is disposed on the image forming side of optical element driving device 1. Imaging part 5 includes, for example, image sensor board 501 and imaging element 502 and control part 503 mounted on image sensor board 501. Imaging element 502 is composed of, for example, a charge coupled device (CCD) image sensor, a complementary metal oxide semiconductor (CMOS) image sensor, or the like, and captures the subject image formed by lens part 2.

Control part 503 is composed of, for example, a control IC, and controls driving of optical element driving device 1. Optical element driving device 1 is mounted on image sensor board 501 and mechanically and electrically connected. Control part 503 may be provided on image sensor board 501, or may be provided in a camera-mounted device (smartphone M in the present embodiment) equipped with camera module A.

In FIG. 2, a subject image is formed on image sensor 502 by driving lens part 2 in the Z direction by optical element driving device 1 with respect to image sensor board 501 whose position is fixed. However, for example, imaging element 502 may be driven in the Z direction. In this case, lens part 2 is fixed to cover 3, and imaging element 502, namely an optical element, is driven in the Z direction by optical element driving device 1 to form a subject image on imaging element 502.

Optical Element Driving Device Body

Optical element driving device body 4 is a main body portion of optical element driving device 1 that drives lens part 2, an optical element, in the Z direction (optical path direction in the present invention). For convenience of explanation, the following description is based on the premise that optical element driving device 1 drives lens part 2, but optical element driving device 1 may drive imaging element 502 as described above.

As illustrated in FIG. 3, optical element driving device body 4 includes holding part 10 and housing part 20. Holding part 10 includes opening 11 surrounding the outer periphery of lens part 2 and capable of holding lens part 2. Housing part 20 surrounds the outer periphery (circumference) of holding part 10 and houses holding part 10 in opening for housing (herein also referred to as "housing opening") 21 located on the inner side.

Holding Part

Holding part 10 includes cylindrical opening 11 in the central portion so as to correspond to cylindrical lens part 2. The inner peripheral surface of opening 11 is configured to be able to hold lens part 2 in opening 11 by forming, for example, a mounting groove or the like.

When optical element driving device 1 drives imaging element 502, it is possible not to provide opening 11 in holding part 10. In this case, for example, holding part 10 may hold imaging element 502 on the upper surface thereof (the surface on the light receiving side).

As an example, outer peripheral surface 12 that is the outer side of holding part 10 is formed in an octagonal shape in plan view. In addition, outer peripheral surface 12 includes first groove parts 13 to 15, each extending along the Z direction, at more than one locations (three locations in FIG. 3 as an example). First groove parts 13 to 15 will be described in detail below.

Housing Part

Housing part 20 includes housing opening 21 that is rectangular in plan view (a square shape in FIG. 3 as an example) in the central portion of the housing part. Housing opening 21 is configured to be able to house therein holding part 10 having the above-described shape. Inner peripheral surface 22 that is the inner side of housing opening 21 includes second groove parts 23a, 24, and 25 each extending along the Z direction and facing corresponding one of first groove parts 13 to 15. The outer shape of housing part 20 is formed in a rectangular shape (a square shape in FIG. 3 as an example) in plan view.

Support Part

First groove part 13, biasing member 23, and ball member 31 form first support part 40A. First groove part 14, second groove part 24, and ball member 32 form second support part 40B. First groove part 15, second groove part 25, and ball member 33 form third support part 40C. Ball members 31 to 33 are rolling members in the present invention.

Figure 4:
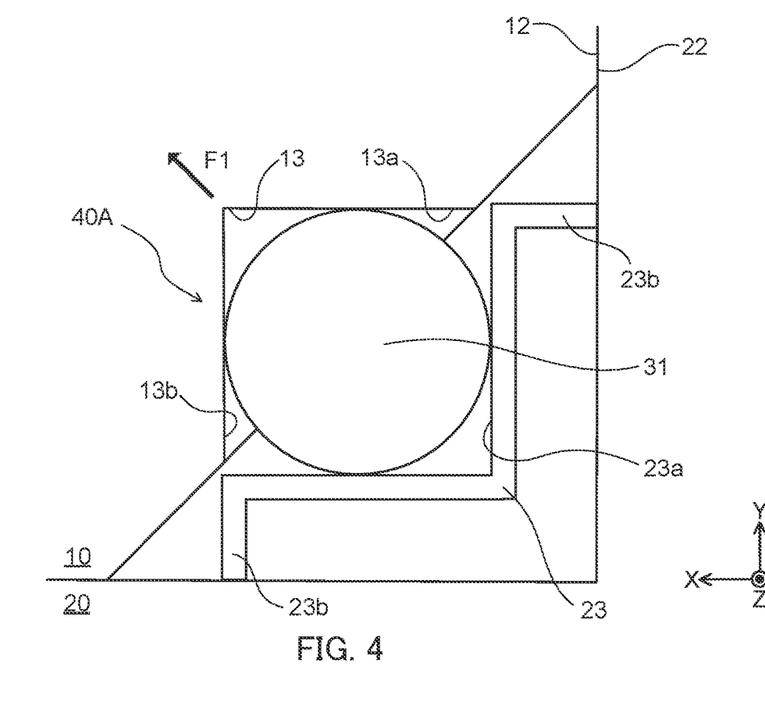
FIG. 4 is a plan view illustrating an enlarged first support part of the optical element driving device body illustrated in FIG. 3 for a detailed description.
Figure 5:
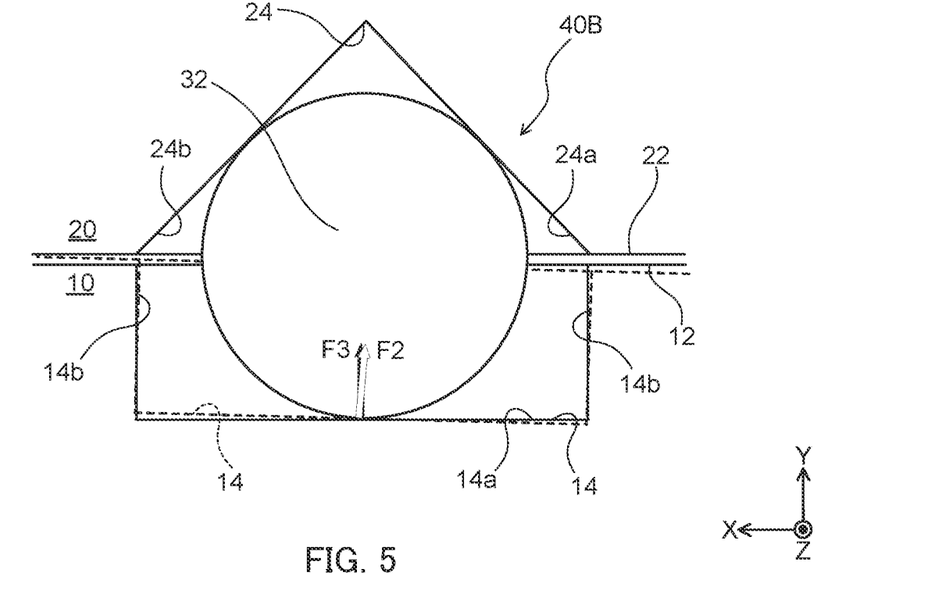
FIG. 5 is a plan view illustrating an enlarged second support part of the optical element driving device body illustrated in FIG. 3 for a detailed description.
Figure 6:
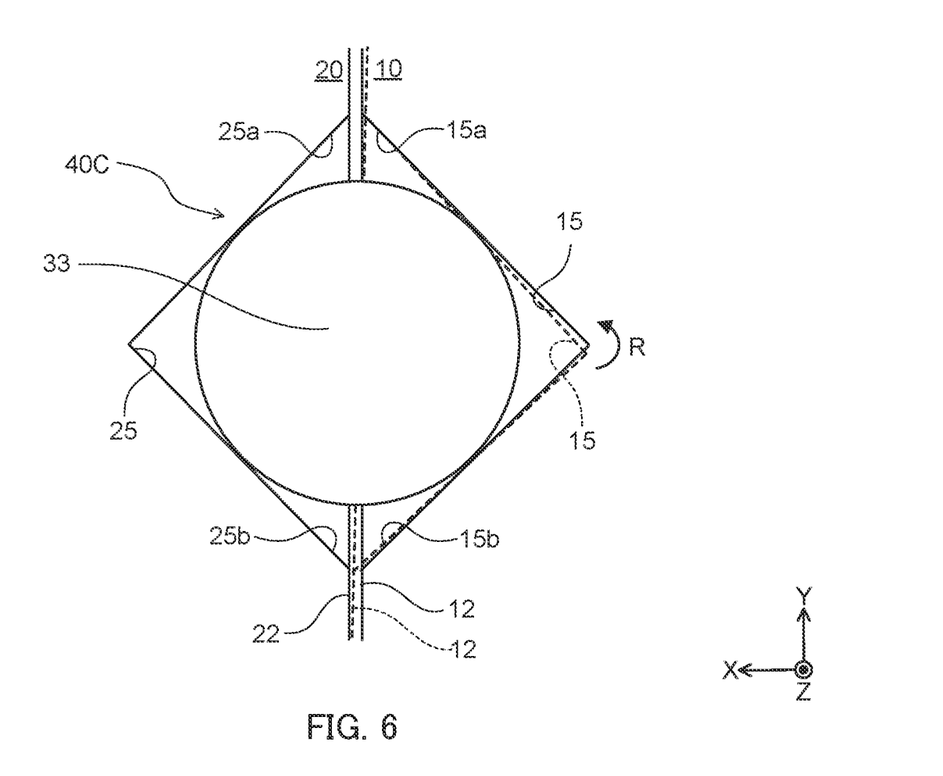
FIG. 6 is a plan view illustrating an enlarged third support part of the optical element driving device body illustrated in FIG. 3 for a detailed description.

First support part 40A, second support part 40B, and third support part 40C will be described with reference to FIGS. 4 to 6. FIG. 4 is a plan view illustrating enlarged first support part 40A of optical element driving device body 4 illustrated in FIG. 3 for a detailed description. FIG. 5 is a plan view illustrating enlarged second support part 40B of optical element driving device body 4 illustrated in FIG. 3 for a detailed description. FIG. 6 is a plan view illustrating enlarged third support part 40C of optical element driving device body 4 illustrated in FIG. 3 for a detailed description.

First Support Part

Housing part 20 includes four corners 20a, 20b, 20c, and 20d. Housing opening 21 includes corner parts of the opening (herein each referred to as "opening corner part") 21a to 21d corresponding to corners 20a, 20b, 20c, and 20d, respectively. In first support part 40A, biasing member 23 is disposed in opening corner part 21a located on the inner side of corner 20a (first corner in the present invention); and first groove part 13 is disposed to face second groove part 23a of biasing member 23. Ball member 31 is disposed between first groove part 13 and second groove part 23a in such a way that the ball member is rotatable. First groove part 13, biasing member 23, and ball member 31 form first support part 40A disposed in opening corner part 21a.

First groove part 13 is a V-shaped groove that is formed to be recessed inward in plan view in outer peripheral surface 12 of holding part 10. First groove part 13 extends along the Z direction. First groove part 13 includes inclined surface 13a and inclined surface 13b. Inclined surface 13a is inclined in plan view with respect to the flat surface of a portion—where first groove part 13 is disposed—of outer peripheral surface 12. Inclined surface 13a contacts the spherical surface of ball member 31 at one point. Inclined surface 13b is also inclined in plan view with respect to the flat surface of the portion—where first groove part 13 is disposed—of outer peripheral surface 12. Inclined surface 13b also contacts the spherical surface of ball member 31 at one point. Inclined surface 13b intersects with inclined surface 13a, thereby forming first groove part 13 into a V-shaped groove.

Such a configuration allows first groove part 13 to contact the spherical surface of ball member 31 at two points. That is, first groove part 13 is formed so as to contact ball member 31 at two points. While ball member 31 is in contact with first groove part 13, first groove part 13 allows the movement of ball member 31 in the Z direction, but does not allow the movement of ball member 31 in the Z-axis orthogonal direction. A pressing force (described below) from ball member 31 is thus transmitted to holding part 10.

In first groove part 13, a rail-shaped member having a V-shaped cross section and made of a metal material or the like may be attached to the groove formed in outer peripheral surface 12. Holding part 10 is typically made of resin or the like, and ball member 31 is typically made of a material such as ceramics or an alloy. Forming first groove part 13 from a rail-shaped member made of a metal material or the like harder than holding part 10 thus can minimize the deformation of first groove part 13 even when the first groove part receives the pressing force from ball member 31. Such a configuration allows first support part 40A to stably support holding part 10 with holding part 10 being movable in the Z direction.

Biasing member 23 is a rail-shaped member including a V-shaped second groove part 23a recessed outward in plan view. Biasing member 23 is made of an elastically deformable material such as metal, and functions as a leaf spring. Biasing member 23 includes above-described second groove part 23a and two fixed parts 23b respectively disposed at both ends of second groove part 23a in plan view.

Two fixed parts 23b are fixed to inner peripheral surface 22 forming opening corner part 21a, thereby supporting biasing member 23 on inner peripheral surface 22 in such a way that the biasing member is elastically deformable.

Second groove part 23a contacts ball member 31. The biasing force caused by the elastic deformation of biasing member 23 presses first groove part 13 via ball member 31, thereby applying pressing force F1 to holding part 10.

As describe above, biasing member 23 is configured to apply pressing force F1 to first groove part 13 (holding part 10) in the direction in which ball member 31 moves toward the inside of opening 11 (the direction of the pressing in the present invention). When opening 11 is a perfect circle in plan view, pressing force F1 is preferably directed toward center C of opening 11 (see broken line L in FIG. 3).

One ball member 31 may be disposed between first groove part 13 and second groove part 23a. However, a plurality of ball members 31 are preferably disposed for stably preventing the inclination (tilt) of holding part 10. In this case, the plurality of ball members 31 are held by a retainer (not illustrated) in such a way that the ball members are arranged along the Z direction at appropriate positions in the Z direction with the distance between the ball members kept constant.

As describe above, first support part 40A uses biasing member 23 to apply pressing force F1 directed toward the inside of opening 11 to holding part 10. Therefore, first support part 40A supports holding part 10 to be movable in the Z direction while the first support part presses holding part 10 toward the inside of opening 11. Inclination of holding part 10 thus can be reduced. As a result, housing part 20 can stably support holding part 10 via first support part 40A.

Second Support Part

In second support part 40B, second groove part 24 is disposed between opening corner part 21b located on the inner side of corner 20b and opening corner part 21d located on the inner side of corner 20d (second corner in the present invention). In other words, second groove part 24 is disposed inside one of two sides sandwiching corner part 20d located diagonally opposite corner part 20a. First groove part 14 is disposed to face second groove part 24. Ball member 32 is disposed between first groove part 14 and second groove part 24 in such a way that the ball member is rotatable. First groove part 14, second groove part 24, and ball member 32 form second support part 40B. As describe above, space-saving second support part 40B is disposed between opening corner part 21b and opening corner part 21d (that is, disposed at a position other than opening corner parts 21a to 21D). Below-described driving part 51, which requires space, thus can be disposed in opening corner part 21b.

First groove part 14 is a U-shaped groove that is formed to be recessed inward in plan view in outer peripheral surface 12 of holding part 10. First groove part 14 extends along the Z direction. First groove part 14 includes, in a plan view, flat bottom surface 14a (flat surface portion in the present invention) forming the bottom of the groove and side surfaces 14b (side surface portions in the present invention) forming side portions on both sides of the groove. The pair of side surfaces 14b are disposed, with bottom surface 14a placed therebetween, along the direction intersecting bottom surface 14a.

A portion—where first groove part 14 is disposed—of outer peripheral surface 12 and a portion—where second groove part 24 facing first groove part 14—of inner peripheral surface 22 are flat surfaces parallel to each other. In FIG. 5, as an example, these flat surfaces are perpendicular to the Y direction in which first groove part 14 and second groove part 24 face each other. In first groove part 14, bottom surface 14a is a flat surface parallel to the portion of outer peripheral surface 12, where first groove part 14 is disposed. Since bottom surface 14a is flat, the bottom surface contacts the spherical surface of ball member 32 at one point. That is, first groove part 14 is formed so as to contact ball member 32 at one point.

As describe above, in second support part 40B and holding part 10, the facing portions that face each other are the spherical surface of ball member 32 and flat bottom surface 14a of first groove part 14. As the spherical surface of ball member 32 and bottom surface 14a of first groove part 14 contact each other at one point, the surfaces are relatively displaceable, and relatively displaced with a predetermined position as a reference.

For example, in the case of a configuration with third support part 40C as described below, holding part 10 can be relatively displaced in the rotational direction with respect to the housing part 20, with the position of third support part 40C as a reference (rotation center). Therefore, ball member 32 and first groove part 14 can be relatively displaced in the circumferential direction of third support part 40C (the circumferential direction is also along inner peripheral surface 22).

In addition, in the case of a configuration without third support part 40C but with one first support part 40A and two second support parts 40B as described in another embodiment below, holding part 10 can be relatively displaced in the circumferential direction along inner peripheral surface 22 with respect to the housing part 20, with the position of first support part 40A as a reference. Therefore, ball member 32 and first groove part 14 are relatively displaced in the circumferential direction along inner peripheral surface 22.

Such relative displacement means that relative displacement between first groove part 14 and second groove part 24, which hold ball member 32, that is, relative displacement between holding part 10 and housing part 20 is allowed.

As described above, first support part 40A presses holding part 10; thus ball member 32 and first groove part 14 are relatively displaced in the circumferential direction in second support part 40B in accordance with the pressure. Due to this relative displacement, the contact position between ball member 32 and first groove part 14 shifts. When the forces acting on the engaging portions are stabilized along with this shift, a position of holding part 10 where the holding part supports second support part 40B is determined. In this manner, the engagement position between second support part 40B and holding part 10 is adjusted.

The dashed line in FIG. 5 indicates a state immediately after first support part 40A starts pressing while first groove part 14 is shifted from the stable position due to, for example, individual differences of parts. A solid line in FIG. 5 indicates a state in which first groove part 14 is relatively displaced to a stable position.

When first groove part 14 is shifted from the stable position, the contact position between the spherical surface of ball member 32 and bottom surface 14a of first groove part 14 is also shifted from the contact position in a stable state. Therefore, contact pressure F2 from bottom surface 14a caused by pressing by first support part 40A acts, via ball member 32, unevenly on inclined surfaces 24a and 24b (described below) of second groove part 24. In such an unstable state, ball member 32 and first groove part 14 are relatively displaced (the contact position is shifted) in accordance with the pressing from first support part 40A. After this relative displacement, contact pressure F3 from bottom surface 14*a* acts evenly on inclined surfaces 24*a* and 24*b* via ball member 32.

When the forces acting on the engaging portions, namely bottom surface 14*a* of first groove part 14, ball member 32, and inclined surfaces 24*a* and 24*b* of second groove part 24, are stabilized in a manner as described above, a support position (engagement position) of holding part 10 with respect to second support part 40B is determined. Such a configuration can always achieve stable support without rattling even when there are individual differences in the dimensions of the parts constituting optical element driving device body 4 and/or in the state in which the parts are assembled.

The distance between side surfaces 14*b* (the distance in the X direction in FIG. 5) may be set as appropriate; however the distance may be, for example, equal to or greater than the width of the opening portion of second groove part 24 (the portion in contact with first groove part 14 in FIG. 5). In addition, when a retainer hold ball members 32, the above-described distance may be less than the width of the retainer (the width in the X direction). Further, when there is an upper limit to the allowable amount of movement of ball member 32, the above-described distance may be equal to the value of the upper limit of the amount of movement.

In first groove part 14, a member made of a metal material or the like may also be attached to the groove formed in outer peripheral surface 12. Bottom surface 14*a*, where ball member 32 contacts, is flat in first groove part 14; thus a flat member is attached on bottom surface 14*a*. Forming first groove part 14 from a flat member made of a metal material or the like harder than holding part 10 can minimize the deformation of first groove part 14 even when the first groove part receives a force (reaction force against the above pressing force F1) from ball member 32. Such a configuration allows second support part 40B to also stably support holding part 10 with holding part 10 being movable in the Z direction.

Second groove part 24 is a V-shaped groove that is formed to be recessed outward in plan view in inner peripheral surface 22 of housing part 20. Second groove part 24 extends along the Z direction. Second groove part 24 includes inclined surface 24*a* (first inclined portion in the present invention) and inclined surface 24*b* (second inclined portion in the present invention). Inclined surface 24*a* is inclined with respect to bottom surface 14*a* in plan view, and contacts the spherical surface of ball member 32 at one point. Inclined surface 24*b* is also inclined with respect to bottom surface 14*a* in plan view, and contacts the spherical surface of ball member 32 at one point. Inclined surface 24*b* intersects with inclined surface 24*a*, thereby forming second groove part 24 into a V-shaped groove. In plan view, the triangle formed by inclined surfaces 24*a* and 24*b* is, for example, an isosceles triangle whose base is on the bottom surface 14*a* side.

Such a configuration allows second groove part 24 contacts the spherical surface of ball member 32 at two points. That is, second groove part 24 is formed so as to contact ball member 32 at two points. While ball member 32 is in contact with second groove part 24, second groove part 24 allows the movement of ball member 32 in the Z direction, but does not allow the movement of ball member 32 in the Z-axis orthogonal direction.

In second groove part 24, a rail-shaped member having a V-shaped cross section and made of a metal material or the like may also be attached to the groove formed in inner peripheral surface 22. Forming second groove part 24 from a rail-shaped member made of a metal material or the like harder than housing part 20 can minimize the deformation of second groove part 24 even when the second groove part receives a force (the above pressing force F1) from ball member 32. Such a configuration allows second support part 40B to also stably support holding part 10 with holding part 10 being movable in the Z direction.

Ball member 32 has the same configuration as ball member 31 described above. At least one ball member 32 is disposed between first groove part 14 and second groove part 24. For stably preventing the inclination of holding part 10, a plurality of ball members 32 are held by a retainer (not illustrated) in such a way that the ball members are disposed along the Z direction at appropriate positions in the Z direction with the distance between the ball members kept constant.

In second support part 40B, second support part 40B engages with holding part 10 in accordance with the pressure from first support part 40A as described above. Housing part 20 thus stably supports holding part 10 via second support part 40B with holding part 10 being movable in the Z direction.

As described above, second groove part 24 does not allow the movement of contacting ball member 32 in the Z-axis orthogonal direction, but first groove part 14 allows the relative displacement of contacting ball member 32 in the above-described circumferential direction. Therefore, in second support part 40B, the relative positions of holding part 10 and housing part 20 are adjusted in accordance with the above-described relative displacement. It is thus possible to absorb the effects of individual differences in the dimensions of the parts constituting optical element driving device body 4 and/or in the state in which the parts are assembled. As a result, housing part 20 can stably support holding part 10 via second support part 40B with holding part 10 being movable in the Z direction, thereby reducing rattling in holding part 10.

Third Support Part

In third support part 40C, second groove part 25 is disposed between opening corner part 21*c* located on the inner side of corner 20*c* and opening corner part 21*d* located on the inner side of corner 20*d*. In other words, second groove part 25 is disposed inside one of two sides sandwiching corner part 20*d* located diagonally opposite corner part 20*a*. First groove part 15 is disposed to face second groove part 25. Ball member 33 is disposed between first groove part 15 and second groove part 25 in such a way that the ball member is rotatable. First groove part 15, second groove part 25, and ball member 33 form third support part 40C. As describe above, space-saving third support part 40C is disposed between opening corner part 21*c* and opening corner part 21*d* (that is, disposed at a position other than opening corner parts 21*a* to 21D). Below-described driving part 51, which requires space, thus can be disposed in opening corner part 21*c*.

First groove part 15 basically has the same configuration as first groove part 13 described above. First groove part 15 is a V-shaped groove that is formed to be recessed inward in plan view in outer peripheral surface 12 of holding part 10. First groove part 15 extends along the Z direction. First groove part 15 includes inclined surfaces 15a and 15b. Inclined surfaces 15a and 15b are each inclined in plan view with respect to the flat surface (flat surface along the Y direction in FIG. 6 as an example) of a portion—where first groove part 15 is disposed—of outer peripheral surface 12. Inclined surfaces 15a and 15b each contact the spherical surface of ball member 33 at one point. Inclined surface 15a intersects with inclined surface 15b, thereby forming first groove part 15 into a V-shaped groove.

Such a configuration allows first groove part 15 to contact the spherical surface of ball member 33 at two points. That is, first groove part 15 is formed so as to contact ball member 33 at two points. While ball member 33 is in contact with first groove part 15, first groove part 15 allows the movement of ball member 33 in the Z direction, but does not allow the movement of ball member 33 in the Z-axis orthogonal direction.

In first groove part 15, a rail-shaped member having a V-shaped cross section and made of a metal material or the like may also be attached to the groove formed in outer peripheral surface 12. Forming first groove part 15 from a rail-shaped member made of a metal material or the like harder than holding part 10 can minimize the deformation of first groove part 15 even when the first groove part receives a force (reaction force against the above pressing force F1) from ball member 33. Such a configuration allows third support part 40C to also stably support holding part 10 with holding part 10 being movable in the Z direction.

Second groove part 25 basically has the same configuration as second groove part 24 described above. Second groove part 25 is a V-shaped groove that is formed to be recessed outward in plan view in inner peripheral surface 22 of housing part 20. Second groove part 25 extends along the Z direction. Second groove part 25 includes inclined surfaces 25a and 25b. Inclined surfaces 25a and 25b are each inclined in plan view with respect to the flat surface (flat surface along the Y direction in FIG. 6 as an example) of a r portion—where second groove part 25 is disposed—of inner peripheral surface 22. Inclined surfaces 25a and 25b each contact the spherical surface of ball member 33 at one point. Inclined surface 25a intersects with inclined surface 25b, thereby forming second groove part 25 into a V-shaped groove.

Such a configuration allows second groove part 25 to contact the spherical surface of ball member 33 at two points. That is, second groove part 25 is formed so as to contact ball member 33 at two points. While ball member 33 is in contact with second groove part 25, second groove part 25 allows the movement of ball member 33 in the Z direction, but does not allow the movement of ball member 33 in the Z-axis orthogonal direction.

In second groove part 25, a rail-shaped member having a V-shaped cross section and made of a metal material or the like may also be attached to the groove formed in inner peripheral surface 22. Forming second groove part 25 from a rail-shaped member made of a metal material or the like harder than housing part 20 can minimize the deformation of second groove part 25 even when the second groove part receives a force (the above pressing force F1) from ball member 33. Such a configuration allows third support part 40C to also stably support holding part 10 with holding part 10 being movable in the Z direction.

Ball member 33 has the same configuration as ball member 31 described above. At least one ball member 33 is disposed between first groove part 15 and second groove part 25. For stably preventing the inclination of holding part 10, a plurality of ball members 33 are held by a retainer (not illustrated) in such a way that the ball members are arranged along the Z direction at appropriate positions in the Z direction with the distance between the ball members kept constant.

As described above, first groove part 15 does not allow the movement of contacting ball member 33 in the Z-axis orthogonal direction. In addition, second groove part 25 does not allow the movement of contacting ball member 33 in the Z-axis orthogonal direction, either. This means that the movement of first groove part 15 and second groove part 25, which hold the ball member 33, that is, the movement of holding part 10 and housing part 20 in the Z-axis orthogonal direction is prevented. On the other hand, first groove part 15 and second groove part 25 allow displacement R of holding part 10 in the rotational direction about the Z axis. As describe above, third support part 40C prevents the movement of holding part 10 and housing part 20 in the Z-axis orthogonal direction, but allows displacement R of holding part 10 in the rotational direction about the Z axis. Therefore, third support part 40C serves as a reference position (rotation center) for displacement of holding part 10 with respect to housing part 20, and allows displacement of holding part 10 in second support part 40B. As a result, second support part 40B can absorb individual differences in the dimensions of the parts constituting optical element driving device body 4 and/or in the state in which the parts are assembled.

Disposition of First to Third Support Parts

First support part 40A, second support part 40B, and third support part 40C described above are provided between holding part 10 and housing part 20. In FIG. 3, first support part 40A, second support part 40B, and third support part 40C are respectively disposed at positions on inner peripheral surface 22 of housing opening 21 (outer peripheral surface 12 of holding part 10). The positions are three different locations that are dispersed in the circumferential direction. First support part 40A, second support part 40B, and third support part 40C in such locations support holding part 10 to be is movable in the Z direction with respect to housing part 20.

When first support part 40A, second support part 40B, and third support part 40C are respectively disposed at three dispersed locations, these support parts are preferably disposed with the angle therebetween of 120°; however, this angle may be changed as appropriate.

When first support part 40A, second support part 40B, and third support part 40C are disposed with the angle therebetween other than 120°, these support parts are preferably disposed as follows. Specifically, in first support part 40A, the direction of pressing force F1 of ball member 31 due to the biasing force of biasing member 23, for example, an extension line obtained by extending the direction of pressing force F1 is imaged (broken line L in FIG. 3). Second support part 40B and third support part 40C are positioned and disposed so as to form a line-symmetrical pair with respect to the imaged extension line. Disposing second support part 40B and third support part 40c at such positions equalize the pressing force that second support part 40B and third support part 40C receive from first support part 40A. Holding part 10 thus can be stably supported.

In addition, when first support part 40A, second support part 40B, and third support part 40C are respectively disposed at three dispersed locations, one first support part 40A, which requires space, is provided at opening corner part 21a. Such a configuration can save the space of the device, reduce the size of the entire device, and reduce the cost required for the device.

In addition, first support part 40A, second support part 40B, and third support part 40C may be respectively disposed at three or more locations dispersed in the circumferential direction. For increasing the number of these support parts, it is preferred to dispose one first support part 40A and one third support part 40C, and increased number of second support parts 40B at the locations, respectively.

For disposing first support part 40A, second support part 40B, and third support part 40C at four or more dispersed locations, based on three-point support that can stably support an object, these support parts are preferably disposed at multiples of three, such as six or nine, locations so as to further support positions between the three points.

Driving Part

Driving part 51 will be described with reference to FIG. 3. Driving part 51 for driving holding part 10 in the Z direction is attached to inner peripheral surface 22 of housing opening 21 (outer peripheral surface 12 of holding part 10). Optical element driving device body 4 can drive lens part 2 and holding part 10 in the Z direction by using first support part 40A, second support part 40B, and third support part 40C described above and driving part 51, thereby achieving an AF function.

Driving part 51 is disposed on inner peripheral surface 22 at a location different from the location where first support part 40A is disposed. Driving parts 51 may be respectively disposed at a plurality of locations. In this case, the driving parts are disposed at the plurality of locations dispersed in the circumferential direction in the same manner as first support part 40A, second support part 40B, and third support part 40C.

For disposing driving parts 51 at, for example, two locations as illustrated in FIG. 3, driving parts 51 are disposed at locations different from the location where first support part 40A is disposed, and facing each other across the broken line L in FIG. 3 (line symmetrical locations). For example, driving parts 51 are respectively disposed at opening corner parts 21b and 21c located on both sides of opening corner part 21a where first support part 40A is disposed.

Driving part 51 may be disposed at one location. In this case, for example, one driving part 51 is disposed in opening corner part 21d that faces, across center C, opening corner part 21a where first support part 40A is disposed.

As driving part 51, for example, a drive source such as a voice coil motor (VCM) or an ultrasonic motor can be used.

As described above, second support part 40B allows the relative displacement of holding part 10 in the circumferential direction, in the present embodiment. Therefore, it is possible to absorb individual differences, if any, in the dimensions of the parts constituting optical element driving device body 4 and/or in the state in which the parts are assembled by relatively displacing holding part 10 in the circumferential direction. As a result, housing part 20 can stably support holding part 10 with holding part 10 being movable, via first support part 40A, second support part 40B, and third support part 40C, thereby reducing rattling in holding part 10.

In addition, in the present embodiment, third support part 40C prevents the movement of holding part 10 and housing part 20 in the Z-axis orthogonal direction, but allows displacement R of holding part 10 in the rotational direction about the Z axis. Therefore, third support part 40C serves as a reference position (rotation center) for the displacement, and allows relative displacement of holding part 10 in second support part 40B. As a result, second support part 40B can absorb individual differences in the dimensions of the parts constituting optical element driving device body 4 and/or in the state in which the parts are assembled.

In addition, in the present embodiment, first support part 40A, second support part 40B, and third support part 40C are respectively disposed in at least three different dispersed locations on the circumference of holding part 10 (on inner peripheral surface 22). Therefore, housing part 20 can stably support holding part 10 via those support parts. Further, first support part 40A is configured to press holding part 10 toward the inside of opening 11. Therefore, first support part 40A supports holding part 10 to be movable in the Z direction while the first support part presses holding part 10 toward the inside of opening 11. Inclination (tilt) of holding part 10 holding an optical element, such as lens part 2, thus can be reduced. As a result, housing part 20 can stably support holding part 10 via first support part 40A, second support part 40B, and third support part 40C. Housing part 20 thus can stably support holding part 10 with holding part 10 being movable even when the size and weight of the optical element, such as lens part 2, are increased.

Other Embodiments

The present invention is not limited to the above embodiment, and can be modified without departing from the scope of the invention.

For example, the three support parts are composed of first support part 40A, second support part 40B, and third support part 40C in the above embodiment; however, the three support parts may be composed of one first support part 40A and two second support parts 40B. In this case, two second support parts 40B are disposed so as to allow relative displacement of holding part 10 in directions different from each other within the Z-axis orthogonal plane, for example, in directions orthogonal to each other.

As describe above, forming support parts, except for one first support part 40A, from a plurality of second support parts 40B allows relative displacement of holding part 10 in a plurality of directions in housing opening 21 of housing part 20. Therefore, the plurality of second support parts 40B can absorb individual differences in the dimensions of the parts constituting components such as holding part 10 and housing part 20 and/or in the state in which the parts are assembled. As a result, housing part 20 can stably support holding part 10 with holding part 10 being movable via first support part 40A and second support parts 40B, thereby reducing rattling in holding part 10.

In the above embodiment, for example, second support part 40B has a configuration such that first groove part 14 that contacts ball member 32 at one point is provided on the holding part 10 side, and second groove part 24 that contacts ball member 32 at two points is provided on the housing part 20 side; however, a reverse configuration is also possible. That is, a first groove part that contacts ball member 32 at two points may be provided on the holding part 10 side, and a second groove part that contacts ball member 32 at one point may be provided on the housing part 20 side. In this case, the first groove part may have a configuration substantially the same as second groove part 24 described above, and the second groove part may have a configuration substantially the same as first groove part 14 described above.

Second support part 40B having such a configuration can also absorb individual differences in the dimensions of the parts constituting components such as holding part 10 and housing part 20 and/or in the state in which the parts are assembled. As a result, housing part 20 can stably support holding part 10 with holding part 10 being movable via first support part 40A and second support part 40B, thereby reducing rattling in holding part 10.

In the above embodiment, for example, smartphone M is described in the above embodiment as an example; however, the present invention is applicable to a camera-mounted device including a camera module and an image processing part that processes image information obtained by the camera module. Examples of such a camera-mounted device include information devices and transporting devices. Examples of the information devices include camera-equipped mobile phones, laptop computers, tablet terminals, mobile game machines, web cameras, in-vehicle devices with cameras (for example, rear-view monitor devices and drive recorder devices), and drones. Examples of the transporting devices include automobiles and drones.

Figure 7A:
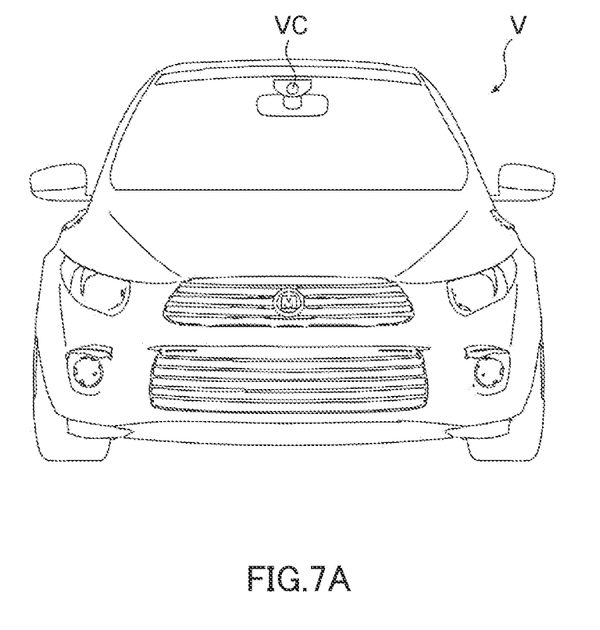
FIG. 7A is a front view illustrating an automobile as a camera-mounted device equipped with an in-vehicle camera module.
Figure 7B:
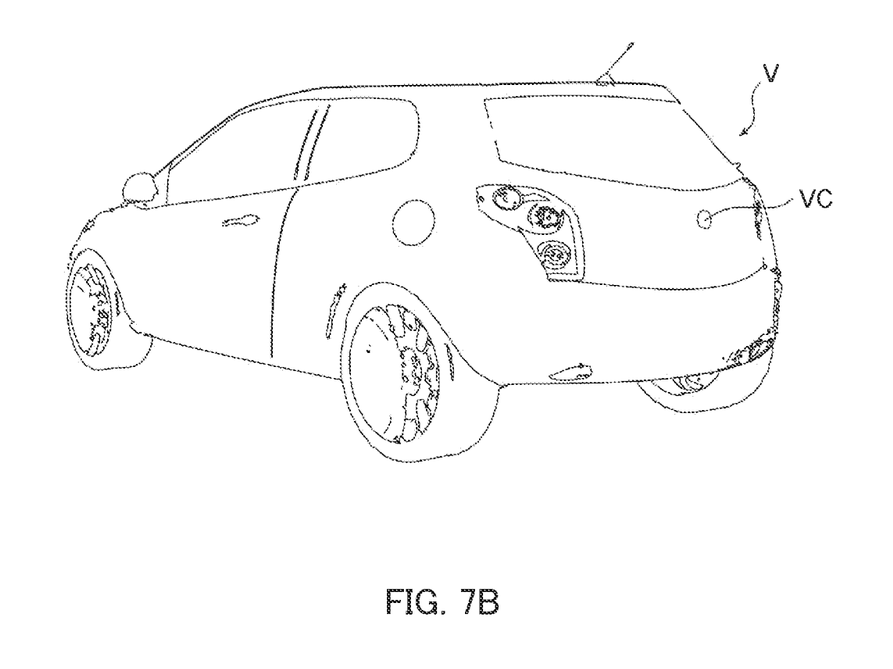
FIG. 7B is a perspective view of the automobile illustrated in FIG. 7A as viewed obliquely from the rear.

FIGS. 7A and 7B illustrate automobile V serving as the camera-mounted device equipped with in-vehicle camera module VC (i.e., vehicle camera). FIG. 7A is a front view of automobile V, and FIG. 7B is a rear perspective view of automobile V. Automobile V is equipped with camera module A described in the above embodiment as an in-vehicle camera module VC. As illustrated in FIGS. 7A and 7B, in-vehicle camera module VC is attached, for example, to a windshield to face forward or to a rear gate to face backward. In-vehicle camera module VC is used for rear-view monitoring, drive recording, collision avoidance control, automatic drive control, and the like.

The above embodiment describes, as an optical element, optical element driving device 1 driving lens part 2; however, the optical element to be driven may be an optical element other than a lens, such as a mirror or a prism, or an optical element such as imaging element 502. In this case, opening 11 of holding part 10 may have a changed shape or, in some cases, may be omitted according to the shape of optical element to be attached.

In the above embodiment, outer peripheral surface 12 of holding part 10 is formed in an octagonal shape in plan view; however, the shape may be suitably changed to a circular shape or another polygonal shape in plan view as long as holding part 10 can be driven in the Z direction. According to the shape of outer peripheral surface 12 of holding part 10, housing opening 21 of housing part 20 is appropriately changed into a shape so as to be able to house holding part 10. In addition, the outer shape of housing part 20 is formed in a rectangular shape in plan view; however, the outer shape of housing part 20 may also be changed as appropriate.

Optical element driving device 1 has an AF function in the above embodiment; however, an optical element driving device having a function of moving lens part 2 in the Z direction, such as a zoom function, in addition to the AF function may be used.

The embodiments of the present invention have been described above. The above descriptions are examples of preferred embodiments of the invention, and the scope of the invention is not limited thereto. The descriptions of the configurations of above devices or the shapes of the part are examples, and it is clear that various modifications and additions to these examples are possible within the scope of the present invention.

INDUSTRIAL APPLICABILITY

The optical element driving device and camera module according to the present invention are particularly advantageous when mounted in camera-mounted devices such as smartphones, mobile phones, digital cameras, laptop computers, tablet terminals, mobile game machines, in-vehicle cameras, and drones

REFERENCE SIGNS LIST

1 Optical element driving device
2 Lens part
3 Cover
4 Optical element driving device body
5 Imaging part
10 Holding part
11 Opening
12 Outer peripheral surface
13, 14, 15 First groove part
20 Housing part
20a, 20b, 20c, 20d Corner
21 Housing opening
21a, 21b, 21c, 21d Opening corner part
22 Inner peripheral surface
23 Biasing member
23a, 24, 25 Second groove part
31, 32, 33 Ball member
40A First support part
40B Second support part
40C Third support part
51 Driving part
301 Opening
501 Image sensor board
502 Imaging element
503 Control part

What is claimed is:

1. An optical element driving device that drives an optical element in an optical path direction, the optical element driving device comprising:
  a holding part capable of holding the optical element;
  a housing part that surrounds a circumference of the holding part and houses the holding part inside the housing part; and
  inside the housing part, a support part that includes at least a first support part, a second support part and a third support part respectively disposed on the circumference at positions different from each other, wherein the support part supports the holding part to be movable in the optical path direction by pressing the holding part by the first support part and engaging the second support part and the third support part with the holding part in accordance with the pressing,
  wherein
  the support part further includes
  a first groove part disposed outside the holding part and extending along the optical path direction,
  a second groove part disposed inside the housing part and extending along the optical path direction, and
  a rolling member disposed between the first groove part and the second groove part in such a way that the rolling member is movable in the optical path direction,
  wherein
  in the first support part and the third support part, both of the first groove part and the second groove part are formed so as to contact the rolling member at two points,
  in the second support part, one of the first groove part or the second groove part is formed so as to contact the rolling member at one point, the first support part includes a biasing member including the second groove part, wherein the biasing member is configured to apply a pressing force to the rolling member via the second groove part contacting the rolling member at two points in such a way that a pressing direction to the holding part is a direction towards an optical axis of the optical element in plan view, and a facing direction between the first groove part and the second groove part in the second support part and a facing direction between the first groove part and the second groove part in the third support part are different from the pressing direction, respectively.

2. The optical element driving device according to claim 1, wherein:

the housing part has a rectangular shape in plan view;
the second support part is disposed in a portion other than portions corresponding to four corners of the housing part.

3. The optical element driving device according to claim 1, wherein:

the support part is configured to allow adjustment of an engagement position between the second support part and the holding part by relatively displacing facing portions of the second support part and the holding part in a circumferential direction according to the pressing, the facing portions facing each other.

4. The optical element driving device according to claim 1, wherein:

in the second support part, the one of the first groove part or the second groove part includes
a flat surface portion that contacts the rolling member at one point, the flat surface portion being perpendicular to a direction in which the first groove part and the second groove part face each other, and
a pair of side surface portions disposed with the flat surface portion placed therebetween, the pair of side portions being disposed along a direction intersecting the flat surface portion.

5. The optical element driving device according to claim 1, wherein:

in the second support part, other one of the first groove part or the second groove part is formed so as to contact the rolling member at two points.

6. The optical element driving device according to claim 5, wherein:

in the second support part, the other one of the first groove part or the second groove part includes
a first inclined portion that contacts the rolling member at one point, the first inclined portion being inclined with respect to a flat surface perpendicular to a direction in which the first groove part and the second groove part face each other, and a second inclined portion that contacts the rolling member at one point, the second inclined portion being inclined with respect to the flat surface perpendicular to the direction in which the first groove part and the second groove part face each other, the second inclined portion intersecting the first inclined portion.

7. The optical element driving device according to claim 1, wherein:

in the second support part, a portion outside the holding part where the first groove part is disposed and a portion inside the housing part where the second groove part is disposed, are flat surfaces perpendicular to a direction in which the first groove part and the second groove part face each other.

8. The optical element driving device according to claim 2, wherein:

the first support part is disposed in a portion corresponding to a first corner among four corners of the housing part; and
the plurality of support parts other than the first support part are disposed in portions other than the portions corresponding to the four corners so as to form a line-symmetrical pair with respect to a direction of the pressing.

9. The optical element driving device according to claim 2, wherein:

the first support part is disposed in a portion corresponding to a first corner among four corners of the housing part; and
the plurality of support parts other than the first support part are disposed on two sides sandwiching a second corner located diagonally opposite the first corner among the four corners.

10. A camera module, comprising:

the optical element driving device according to claim 1;
a driving part that drives the holding part in such a way that the holding part is movable in the optical path direction; and
an imaging part that captures a subject image by using the optical element.

11. A camera-mounted device that is an information device or a transporting device, the camera-mounted device comprising:

the camera module according to claim 10; and
an image processing part that processes image information obtained by the camera module.

12. The optical element driving device according to claim 3, wherein:

the support part relatively displaces the facing portions of the second support part and the holding part in the circumferential direction by displacing the holding part in a rotational direction about the position of the third support part.

* * * * *